INVENTOR.
Curtis J. Schultz
BY
Mueller & Aichele
Attys.

Dec. 16, 1958 C. J. SCHULTZ 2,864,943

CENTRAL STATION INTERROGATION VIA RELAYS OF UNATTENDED DATA SATELLITES WHICH ANSWER BACK

Filed Feb. 24, 1954 5 Sheets-Sheet 2

INVENTOR.

Curtis J. Schultz

BY Mueller & Aichele

Attys.

CENTRAL STATION INTERROGATION VIA RELAYS OF UNATTENDED DATA SATELLITES WHICH ANSWER BACK

Filed Feb. 24, 1954 5 Sheets-Sheet 3

INVENTOR.
Curtis J. Schultz
BY Mueller & Aichele
Attys.

INVENTOR.
Curtis J. Schultz
BY Mueller & Aichele
Attys.

INVENTOR.
Curtis J. Schultz
BY Mueller & Aichele
Attys.

2,864,943
Patented Dec. 16, 1958

2,864,943

CENTRAL STATION INTERROGATION VIA RELAYS OF UNATTENDED DATA SATELLITES WHICH ANSWER BACK

Curtis J. Schultz, Elmhurst, Ill., assignor to Motorola, Inc., Chicago, Ill., a corporation of Illinois Application February 24, 1954, Serial No. 412,221

12 Claims. (Cl. 250—15)

This invention relates generally to a remotely controlled radio communication system, and more particularly to a system for obtaining at a central point data from remote points through radio equipment which includes a base station which communicates directly or through a relay station to data stations at the remote points, with all the equipment being controlled from the central point.

There are many applications in which it is desired to collect and coordinate data at a central point which originates from one or more remote points. In some instances the remote points may be relatively inaccessible so that it is desirable to provide data transmitting equipment at these points which is small and lightweight and can therefore be easily transported to such a point, and which includes its own power source. Further, it is desired that such equipment can be controlled remotely so that there is no requirement for operators at the remote points. Communication to and from the data stations may be provided from a base station over radio channels. However, the distances involved may be such that reliable low power communication cannot be obtained without the aid of one or more intermediate relay stations. Any such intermediate stations should also be compact and include their own power supplies, and should be subject to control without an attendant at the relay station.

In order to control the equipment and obtain the desired data at a location where it can be studied and used, it may be desired to provide control of the system at a control room remote from the base station. In such case it is desirable that the interconnection between the control room and the base station be as simple as possible to reduce the cost, while still providing complete control of the base station, the data stations and the intermediate relay stations, if any.

It is therefore an object of the present invention to provide a simple and flexible radio communication system for selectively obtaining at a control station information from a plurality of remote data stations.

A further object is to provide such a system in which individual data stations may be selected from the control station and particular information called for from the selected station.

A still further object of this invention is to provide a communication system including unattended remote relay and data stations which are energized only intermittently to conserve power, and which are held energized in response to particular signals received thereby.

Another object of the invention is to provide a radio data collecting system including a base station, at least one relay station and a plurality of data stations, which system may be controlled by an operator at a control room connected to the base station over a single conductor pair.

A feature of this invention is the provision of a radio communication system for providing communication between a base station and a plurality of remote stations wherein signals transmitted by the base station includes modulation identifying individual remote stations and each remote station is energized in response to receipt of a signal including its identifying modulation. The remote stations may be intermittently energized to check or sample to see if the particular signal is received. The station identifying signal may be a subcarrier wave amplitude modulated with a particular tone for identifying a particular station.

A further feature of this invention is the provision of a radio system for obtaining information from remote stations at a control point, wherein a signal transmitted to the remote station is modulated by pulses, with different numbers of pulses identifying various different items of data which it is desired to obtain. This may be provided by interruption of the transmitted subcarrier wave by a dial.

Another feature of this invention is the provision of a remotely controlled radio system including a base station connected to the control room by a single channel such as a wire line, in which the base station communicates by radio with remote data stations and may utilize intermediate radio relay stations. The base station equipment may be controlled by the application of direct current potentials over the wire line, and the data stations and relay stations are controlled by the application of a subcarrier wave and/or modulating tones which provide control operations thereat. At the relay stations, the reception of the subcarrier wave causes an intermittently operated receiver to be continuously operated and the reception of various tones switches one item of equipment, such as a transmitter or receiver, for another to provide continuing operation of the system in the event of equipment failure.

Further objects, features and the attending advantages of the invention will be apparent from a consideration of the following description when taken in connection with the accompanying drawings, in which.

In practicing the invention there is provided a system for obtaining information at a control point from a plurality of unattended remote data stations. Communication is provided from the control point to a base station over a single communication channel such as a wire line. The base station includes a radio transmitter and a radio receiver for communication with the data stations either directly or through relay stations. A subcarrier wave is generated at the control point and may be modulated by one of a plurality of different tones and applied to the base station for transmission over the radio transmitter. The relay stations include receivers intermittently operated which are locked in energized condition upon receipt of the subcarrier wave and are held energized by the continued reception of a carrier wave. The data stations similarly may be intermittently energized and held energized upon receipt of a carrier wave including a subcarrier wave modulated by the tone identifying a particular station. The data stations may include various data measuring equipment to indicate conditions such as temperature or pressure at the remote point. To select a particular item, the subcarrier wave originating at the control point may be further modulated by a number of pulses which operate at the data station to select one equipment and apply information therefrom to the data station transmitter. Signals from the data station transmitter are relayed by the relay station and received at the base station, with the information being applied through the communication channel to the control point at which the data may be considered.

A second base station may be provided to insure continued operation in the event of failure of the first station. Further, the relay stations may include alternate equipment which may be selectively connected so that any item of equipment may be substituted in the event of failure of another item. Selection of base stations and of equipment at the relay stations may be controlled from the central control point by the use of control signals which may include direct currents and tone modulation to the subcarrier wave. The base station may be arranged for operation at a plurality of different frequencies and a plurality of relay stations may be provided for operation at the different frequencies. In such a system a plurality of data stations may be provided for each frequency to thereby increase the number of stations which can be monitored by the system. The frequency can also be controlled at the central station.

Figure 1:
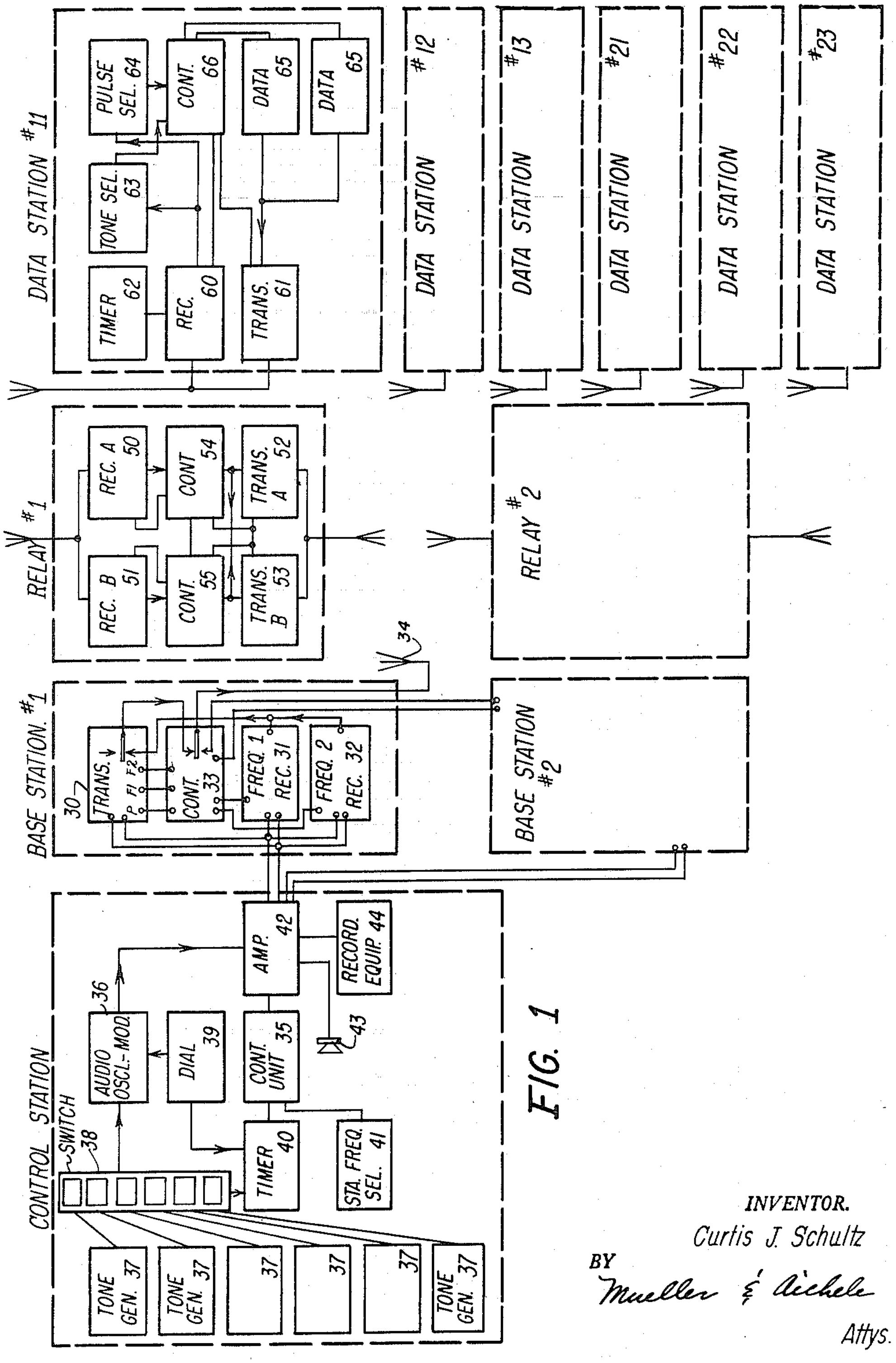
Fig. 1 is a block diagram of the overall data collecting radio communication system.

Referring now to the drawings, in Fig. 1 the overall system is shown in block diagram form. There is shown a control station, first and second base stations, first and second relay stations and a plurality of data stations. In some instances the control station and the base stations may be at the same location at a central point. However, if it is desired to place the control station at a different location, the control station may be connected to each base station by a single pair wire line.

The base station includes a transmitter 30 which is arranged to operate on either of two different frequencies. Receivers 31 and 32 are provided which also operate on two different frequencies. The second base station may be substantially identical to the first base station and is provided so that operation of the system may be continued in the event of the failure of a component of the first base station. That is, the base stations are not used at the same time but the second base station serves as a spare in the event of failure of the first.

The entire system is controlled by the control station which includes a control unit 35 for controlling the amplifier 42 coupled to the base station. An oscillator 36 is provided for producing a subcarrier wave which may be in the middle audio frequency range such as 2 to 6 kilocycles. The wave from the oscillator may be modulated by tones produced by tone generators 37 which are selectively applied to the unit 36 by push button switches 38. Either amplitude or frequency modulation of the subcarrier wave may be used. The wave from the oscillator is applied to the amplifier 42, and may also be modulated by pulses from dial 39. Actually the dial is illustrated as an interrupter to cut out the subcarrier wave but alternatively could be used to shift its operating frequency. A timer 40 is provided which may be started by the push button switches 38 to control the length of a transmission. That is, the push buttons in addition to selecting a tone may initiate operation of a system to transmit the subcarrier wave modulated by the tone.

For controlling the base stations, a selector 41 is provided to control the signals applied to the base stations for selecting a particular base station, and for controlling the frequency of transmission therefrom. Although various types of control signals may be used, in the apparatus illustrated direct current potentials varying in amplitude and polarity are provided. This control operates relay 33 at the base station to condition the transmitter for operation on one frequency or the other and also to select the proper receiver, and to connect the selected components to the antenna 34. The amplifier 42 amplifies signals applied to the base stations and also signals received at the control station from the base stations. This amplifier has two outputs; one coupled to the loudspeaker 43, and the second coupled to the data recording equipment 44.

Each relay station may include two receivers 50 and 51 designated receiver A and receiver B, and two transmitters 52 and 53 designated transmitter A and transmitter B. These receivers and transmitters are connected so that signals received by either receiver may be re-transmitted by either transmitter. The receivers both operate on the same frequency and are provided to serve as spares for each other. Similarly, the transmitters may be identical and serve as spares for each other. The receivers and transmitters are selectively connected by control units 54 and 55 controlled by tones selected at the control station.

The relay station receivers are normally intermittently energized through timers in the control units which operate to energize the receivers for short recurring periods such as two seconds out of every twenty seconds. Coupled to the timers are lock circuits which may cause a receiver to be continuously energized. The lock circuits are connected to the output of the receivers and are initially operated in response to the reception of the subcarrier wave by the momentarily energized receiver. The lock circuits are also connected to the squelch circuits of the receivers so that as long as a carrier is being received, the receiver will remain energized. This circuit also provides a small delay so that if the carrier is interrupted for a short period such as ten seconds, the receiver will remain energized.

The relay station No. 2 may be identical to relay station No. 1 except that the receivers and transmitters operate on different frequencies. The receivers of relay No. 1 may be tuned to the frequency No. 1 of the base station transmitters, and the receivers of relay No. 2 may be tuned to the frequency No. 2 of the base station transmitters.

The data stations which are provided at different remote locations may be arranged to communicate with either relay station No. 1 or No. 2. Data stations 11, 12 and 13, for example, may have receivers and transmitters operating at frequency for communicating with the receivers and transmitters of relay station No. 1. Data stations 21, 22 and 23 may have frequencies for communicating with relay station No. 2. Each data station includes a receiver 60, a transmitter 61, and a timer 62. The timer 62 is similar to the timer 55 of the relay stations and causes the receiver to be operated intermittently for short intervals such as two seconds out of every twenty seconds. A tone selector 63 is provided and coupled to the output of the receiver so that when a signal is received including the subcarrier wave modulated by a particular tone, the tone selector will cause the control unit 66 to hold the receiver energized for a period of two minutes.

Each data station also includes a pulse selector 64 coupled to the receiver 60, which responds to the interruptions of the subcarrier wave produced by the dial 39 at the control station to select a particular data measuring device 65 at the data station. A plurality of data measuring devices may be provided at each station for measuring any desired quantities, such as temperature and pressure, and these devices produce signals which represent the measurement. These signals are in the form of audio tones which may be transmitted over the radio system. The selector 64 causes the control unit 66 to connect one of the devices 65 to the transmitter 61 so that the signals are transmitted therefrom to the relay station, being relayed from the relay station to the base station. Signals from the base station are then applied to the control station and are recorded on the equipment 44 thereat.

It is therefore seen that the system provides complete control from the control station so that either base station No. 1 or No. 2 may be energized and the energized station may operate on either frequency No. 1 or No. 2.

The selection of frequency causes automatic selection of a relay station and of a group of data stations which operate with this frequency. The control station can further select either receiver or transmitter at the relay station by the transmission of a particular tone as modulation of the subcarrier wave. After one group of data stations is selected by the selection of a carrier frequency, an individual station in the group may be selected by the connection of a particular tone generator. Then, a particular data measuring device can be picked out at the selected station by dialing the number associated with the particular device. As previously stated, the relay and data stations are energized only intermittently so that these stations which may be located at remote inaccessible points consume a minimum amount of energy. The control station includes a timer for automatically applying transmission for the time required to energize a relay station and the selected data station so that the desired information can be selected and transmitted back to the control station.

Figure 2:
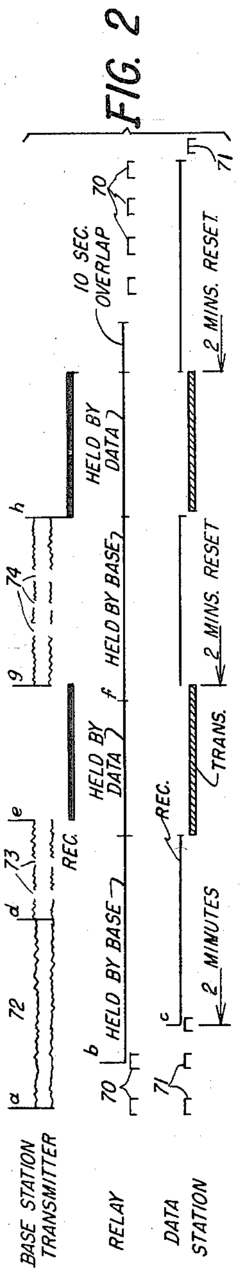
Fig. 2 is a chart illustrating the operation of the system.

The operation of the system is illustrated in Fig. 2 wherein the top of the chart shows the operation at the base station, the middle part shows the operation at the relay, and the lower part shows the operation at the data stations. The pulses 70 indicate the sampling action at the relay station, that is, the energization of the receiver thereat for two seconds during each twenty-second interval. The pulses 71 similarly represent the sampling at the data stations. The wave 72 indicates the modulation of the subcarrier wave transmitted from the base station. This transmission is shown starting at time *a* after the first pulse 70 so that the relay does not lock in until the second pulse 70 comes along at which time *b* the modulated subcarrier wave 72 will be received and cause prolonged energization of the relay station. This relay station will remain on as long as a carrier wave is received. The data station will not be energized until it receives the signal from the relay station so that it will not be energized until time *c*. Accordingly, it may require a total of 40 seconds for both the relay and the data station to be energized if the sampling actions thereat are staggered so that a full interval is required in each case. When the data station is energized, the timer at this station causes the same to remain energized for two minutes.

In order to assure that both the relay and data stations are energized, a timer at the control station causes transmission of the modulated subcarrier wave for at least 40 seconds. After this 40-second interval, an indication appears at the control station that the selected data station is ready to receive a query for a particular piece of information. Accordingly, at time *d*, which is at least 40 seconds later than time *a*, the dial at the control station may be operated to pulse the carrier wave as shown at 73. Shortly after the dial returns at time *e*, the transmitter at the base station is deenergized and the receiver thereat is energized. After the pulses have been received by the data station, the receiver at the data station is de-energized and the transmitter thereof is energized. This occurs substantially simultaneously with the de-energization of the transmitter and energization of the receiver at the base station, at time *e*. Although there may be a slight interval after the transmission at the base station stops before transmission at the data station starts, the relay station will remain energized as the circuits thereat are arranged to hold the station energized in the absence of a carrier wave for a ten-second interval. Accordingly, from the period *e* to the period *f* while the data station is transmitting, the relay station will be held energized by the carrier wave originating from the data station. During this period the signal transmitted from the data station will be relayed and received at the base station where the signal is applied to the control station for recording.

At the end of the transmission from a data station, the timer at this station will be re-set to provide a further two minutes of operation. Accordingly, if further information is required from this same data station, it is merely necessary to re-select the station without waiting for the forty-second interval since the relay and data stations are already energized. A delay of five seconds is required so that the equipment at the data station restores itself for a second program selection. Accordingly, if the switch for selecting the data station is operated and then a second program is dialed, the required measuring device at the data station will be connected and signals therefrom transmitted back to the base station.

The period from *f* to *g* (Fig. 2) represents the interval after completion of the first transmission before the station is again selected. After a short period, the carrier may be pulsed as shown at 74, and then at time *h* the transmitter at the base station cuts off and the receiver is energized. At the same time the data station receiver is de-energized and the transmitter thereat is energized. If after this second program no further program is called for, the relay station will be de-energized after a period of ten seconds and start sampling. The data station will be re-set for a further two-minute interval after which its receiver is de-energized and the sampling operation will continue. It will be apparent that the relay station is held energized alternately by the base station and the data station as the stations alternately transmit. If the delay in calling for a second program is sufficient that the relay station drops out, it will be necessary to wait after selecting a station for a sufficient interval to be sure that the relay station is energized. The data station remains energized for a period of two minutes as previously described.

Figure 3:
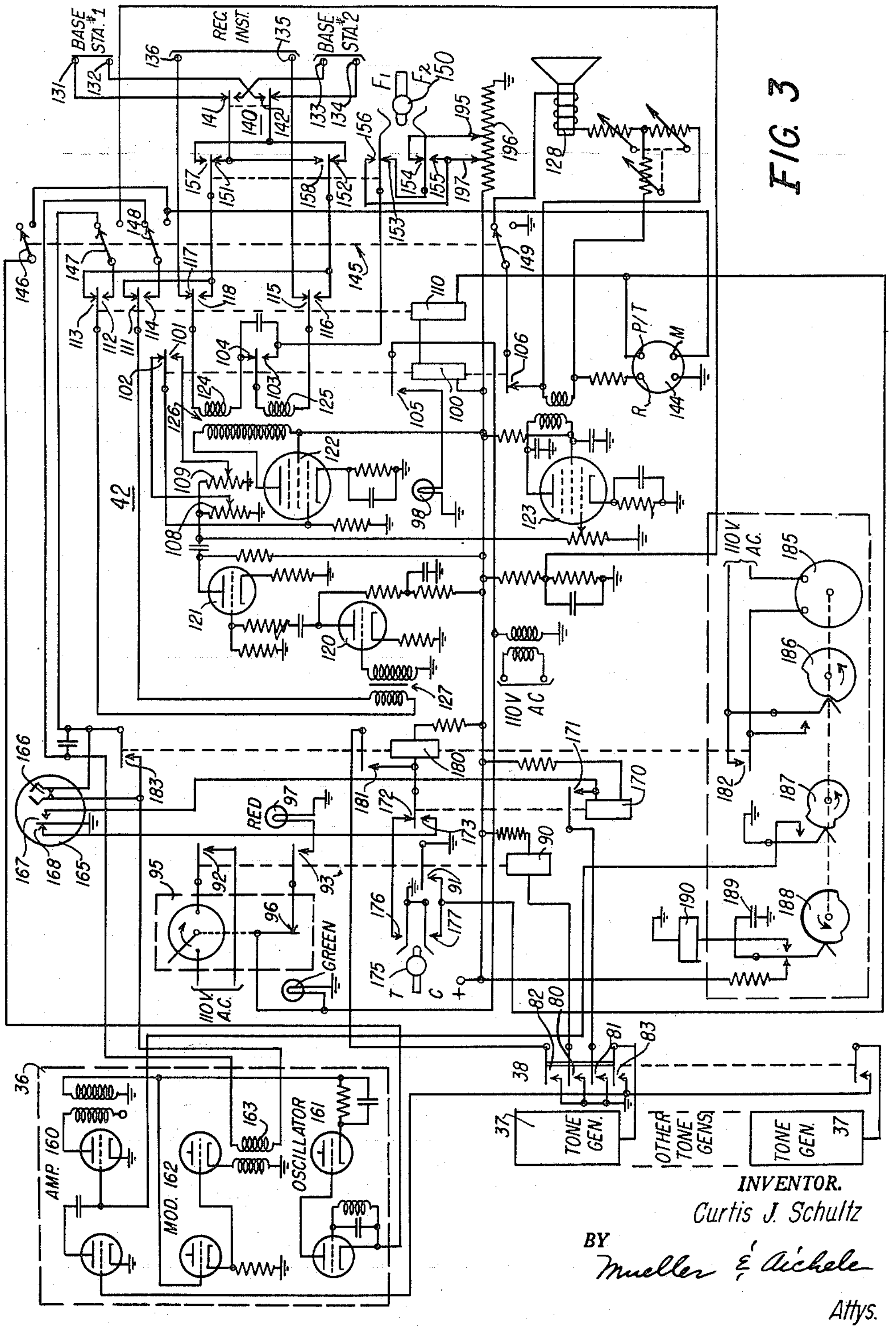
Fig. 3 illustrates in more detail the equipment at the control station.

Reference is made to Fig. 3 which shows more specifically the equipment at the control station. To initiate operation of the system a push button 38 is depressed which includes contacts 80, 81 and 82 for providing control of the system and contacts 83 for connecting one of the tone generators to the oscillator and modulator chassis 36. The contact 80 provides a ground connection to the coil of relay 90 for energizing this coil. This relay includes contacts 91 which apply a ground to the coils of relay 100 and 110. The contacts 92 of relay 90 energize the motor of timer 95 and the contacts 93 close a circuit through contacts 96 of the timer 95 to the red indicator light 97.

The relays 100 and 110 change the control system from receiving to transmitting condition. Relay 110 changes the connections of the amplifier 42, and relay 100 provides the other changes in connections required in the system. The amplifier 42 includes the tubes 120, 121, 122 and 123, with signals being applied to the amplifier through transformer 127 and derived therefrom through transformer 126. Tube 123 provides a separate output when receiving for the loudspeaker 128.

Switch 140 changes the input and output connections from the control station so that connection is made either to base station No. 1 or base station No. 2. As shown, connection is established through contacts 141 and 142 to terminals 131 and 132 connected to base station No. 1. When the switch 140 is in its other position, connection will be made to terminals 133 and 134 connected to base station No. 2. Switch 150 provides the various direct current potentials to the leads as will be described more in detail.

Considering now the operation of relay 110, in the position shown connections are established from base station No. 1 through switches 140 and 150 and contacts 111 and 113 of the relay 110 to the input transformer 127 of the amplifier 42. The output from the transformer 126 is applied through contacts 115 and 117 of relay 110 to terminals 135 and 136 connected to the recording instruments. Accordingly, in the receiving position the signals from the base station are amplified and applied to the recording instrument. These signals are also applied from the amplifier stage 123 to the loudspeaker 128. When relay 110 is actuated for transmission, the modulating apparatus 36 is connected to the input of the amplifier 42 through contacts 112 and 114 of the relay 110, as will be described more in detail. The output of the amplifier from transformer 126 is then applied through contacts 116 and 118 and through switches 140 and 150 to the base stations.

Operation of relay 100 changes the coupling between tubes 121 and 122 from the potentiometer 108 to the potentiometer 109. These potentiometers provide separate level controls for the amplifier when used for receiving and transmitting. Contact 104 is broken by energization of relay 100 to break the direct current connection between windings 124 and 125 of the transformer 126 so that direct current may be applied thereto through the contact 103. Contact 105 energizes the indicator light 98 so that it is apparent that the equipment is in transmitting condition. Contact 106 breaks the connection to the loud speaker 128 so that it will not operate during transmission from the control station.

As previously stated, operation of the push button 38 closes contact 83 thereof to connect one tone generator 37 to the oscillator and modulator 36. The tone generators 37 are continuously operating and the signals therefrom are selectively applied through the push button switches 38. The signal is amplified in the amplifier section 160. The subcarrier generator 161 is an oscillator which generates a relatively high audio frequency such as 6 kilocycles. The output of the amplifier 160 and oscillator 161 are both applied to the modulator 162 which amplitude modulates the subcarrier wave by the tone producing the modulated output at the transformer 163. As previously stated, this output is applied through the contacts 112 and 114 to the input of the amplifier 42 when the relay 110 is energized. It is therefore seen that by operation of the push button switch 38 the subcarrier wave will be modulated by the particular tone and connections will be made to apply this modulated wave amplified by the amplifier 42 to the terminals connected to the base station No. 1. It will be apparent that when the station selector switch 140 is in the No. 2 position, the connection will be made to terminals 133 and 134 connected to base station No. 2.

The modulated subcarrier wave is transmitted for a 40-second interval at which time the timer 95 breaks contacts 96 so that the red light is turned off. This indicates that the relay and data stations are now locked on. The program desired may now be dialed, and this may be accomplished by the standard telephone type dial 165. The dial includes contacts 166 which interrupt the connection from the transformer 163 to the contacts 112. As the dial is removed away from this normal position, contacts 167 thereof are closed to provide a ground for the coil of relay 170.

Contacts 171 of relay 170 complete a holding circuit therefor through the contacts 81 of the push button switch 38. Contacts 172 are normally closed to connect the contact 176 of the transmit clear key 175 to the coil of relay 180. However, upon energization of the relay 170, contacts 172 open and contacts 173 close to provide a circuit to the relay 180 through the contacts 168 of the normal contact of the dial. Accordingly, when the dial returns to its normal position, the relay 180 will be operated.

Contacts 181 of relay 180 close to establish a holding circuit for the relay 180 through the contacts 82 of the push button switch 38. Contacts 182 thereof close to start operation of the timer 185, and contacts 183 also close to short the interrupter contacts 166 of the dial 165 so that further modulation of the modulated subcarrier wave cannot be accomplished by inadvertent movement of the dial.

The timer 185 operates to cut off the transmitter which was initially started by the operation of the push button switch. The timer includes a first disc 186 which operates to hold the timer energized until a complete cycle has taken place. Disc 187 operates to ground the grid of the second stage of the amplifier 160 so that no modulation will be applied to the modulator 162. This is necessary so that cutting off the transmitter does not have the effect of an additional pulse of interruption of the modulated carrier wave. The timer disc 188 operates to connect condenser 189, which has been charged through the contacts held closed by disc 188, to the release solenoid 190 to release push buttons which have been operated. Release of the push button which has been operated opens the control contacts thereof to release all of the relays 90, 100, 110, 170 and 180 so that the control equipment is prepared for a second operation.

Energization of the transmitters at the base stations is accomplished by direct current applied through the circuit connected to the base stations. As previously stated, operation of the relay 100 causes contacts 103 thereof to be closed to connect a direct current potential to the secondary winding 125 of transformer 126. This is provided through the closed contacts 153 and 154 of switch 150 and from the adjustable tap 195 on potentiometer 196 which is connected to the B plus potential. This direct current potential operates to energize the connected base station transmitter. When the switch 150 is moved to the F1 position, connection is made from the tap 197 on resistor 196 through contacts 155 and contact 103 of relay 100 to the winding 125. This provides increased current of the same polarity over the control line. When the switch 150 is pushed to the F2 position, the potential from point 197 is applied through contacts 156 to the secondary 125. However, in this instance the contacts 151 and 152 are broken and the contacts 157 and 158 are closed to reverse the polarity of the direct current potential to the lines connected to the base stations. This potential of opposite polarity selects the second frequency at the transmitter.

Key 175 in the C or clear position closes contacts 176 to energize relay 180 which starts the turnoff sequence and energizes the release solenoid 190. In the T or transmit position, key 175 closes contacts 177 which short the contacts 91 of relay 90 to energize relays 100 and 101 to start the transmit sequence.

To provide speech transmission from the control station, a plug 144 is provided for connection of a hand set, and switch 145 makes connection to the plug 144 for operation therethrough. The connection P/T is from the push-to-talk switch on the hand set and operates relays 100 and 110 to initiate the transmitting operation. Terminal M is for the microphone and terminal R is for the receiver. The switch 145 includes a contact 146 for applying the subcarrier signals from the oscillator 161 to the transmitter as required for causing the relay stations to lock on. Contacts 147 and 148 connect the signals from the microphone to the amplifier 42. Contact 149 disconnects speaker 128 and provides a ground to complete the circuit to the receiver connected to the plug 144. Accordingly, by operation of the switch 140 the equipment may be conditioned to transmit and receive speech.

Figure 4:
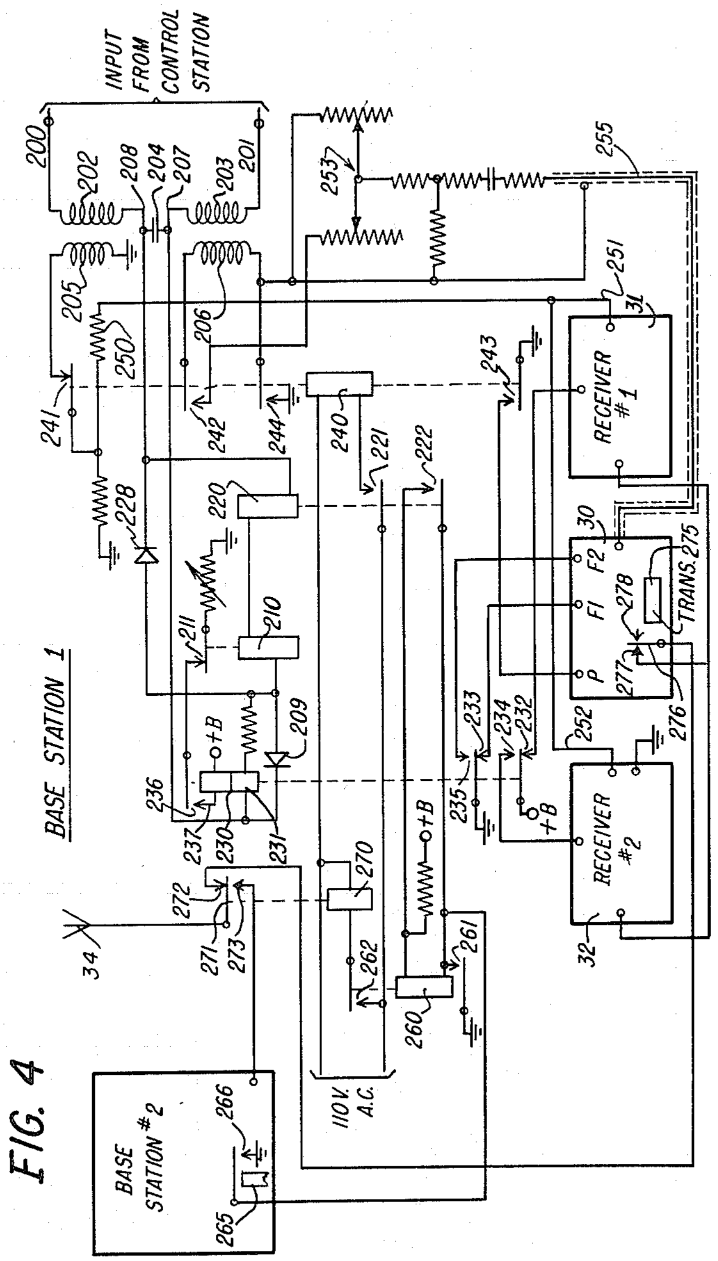
Fig. 4 illustrates the equipment at a base station.

Reference is now made to Fig. 4 which shows the equipment at one base station together with the interconnections required to the antenna and to the second base stations. The input terminals 200 and 201 are connected by a two-wire line to the terminals 131 and 132 of the control station as shown in Fig. 3. Accordingly, the signals will be applied across transformer windings 202 and 203 and the direct current will be developed across condenser 204. The audio signals are applied from the windings 202 and 203 to the windings 205 and 206 connected to the receivers 31 and 32, and the transmitter 30 respectively.

When the direct current applied is of such polarity that the terminal 207 is positive with respect to terminal 208, current will flow from terminal 207 through the rectifier 209 to the relay 210 and the relay 220 back to the terminal 208. On the other hand, when terminal 208 is positive with respect to terminal 207, current will flow through the rectifier 228 and the winding 231 of relay 230 back to the terminal 207. As was previously stated, the application of a small potential which is positive at terminal 207 takes place in response to operation of relay 100 at the control station for energizing the transmitter. A momentary current of larger amplitude is applied when the frequency selector switch 150 at the control station is in the position for selecting frequency No. 1, and a current of the opposite polarity is applied when the key is in a position for selecting frequency No. 2. The smaller current of the first polarity is sufficient to operate relay 220 but not to operate relay 210. The larger current operates both relays so that when the large current of one polarity is applied, relay 210 is operated. When the current of the opposite polarity is applied, relay 230 is energized.

Considering now the operation of the system, when the transmit potential is applied, relay 220 is energized and the contacts 221 thereof are closed for energizing relay 240. Relay 240 includes the contacts 241 which are normally closed to connect the winding 205 through resistor 250 to the audio output leads 251 and 252 respectively of receivers 31 and 32. Accordingly, the winding 205 is normally connected to the receiver so that signals received therefrom are applied through transformer windings 202 and 203 to terminals 200 and 201 which are connected therefrom to the control station. When relay 240 is energized, contacts 242 thereof are closed to make a connection from the winding 206 through the level control 253 to the audio input lead 255 of transmitter 30. Relay 240 also includes contacts 244 which close to ground the other side of the audio circuit. For energizing the transmitter 30, relay contacts 243 are provided which apply a ground to the power supply of the transmitter for energizing the same.

The transmit relay 220 also includes contacts 222 which short the coil of relay 260. The relay 260 is normally deenergized but may be energized when communication is provided through base station No. 2. A relay 265 is shown in base station No. 2 which will be closed when this station is selected. This relay has contacts 266 which when closed will energize the relay 260. The relay 260 has contacts 261 for holding the same energized if operation takes place from base station No. 2. However, if the relay 260 is energized, it will be deenergized by the contacts 222 which short the coil 60, and this will break the holding circuit also. Relay 260 includes contacts 262 which when closed, energize the antenna changeover relay 270. This relay includes movable contact 271 connected to the antenna, and fixed contacts 272 and 273 individually connected to the transmitter 30 of base station No. 1 and to the corresponding transmitter of base station No. 2. In the unenergized condition relay 270 connects the antenna 34 to the transmitter 30 of base station No. 1. If, however, base station No. 2 and its relay 265 are energized, and base station No. 1 is not operating, the relay 260 will be energized and lock up to energize relay 270 so that the antenna 34 is connected to the transmitter of base station No. 2.

In the unenergized condition of relay 230, the contacts 232 thereof apply B plus potential to receiver No. 1, and the contacts 233 thereof apply ground to the oscillator No. 1 in transmitter 30. This sets up the equipment at base station No. 1 for operation on the frequencies provided by receiver No. 1 and the first oscillator in the transmitter. When it is desired to operate on frequency No. 2, by operation of the key 150 at the control station, the polarity of the control voltage is reversed and this energizes relay 230, as previously stated, to break the contacts 232 and establish contacts 234. This applies B plus to receiver No. 2. Similarly, contacts 233 are broken and contacts 235 are closed to provide a ground for oscillator No. 2. This causes operation of the base station equipment at the alternate frequency. Contacts 236 of relay 230 provide a holding circuit through the second coil 237 thereof and which extends to the contacts 211 of relay 210. Accordingly, relay 230 is held in operation after once operated so that the equipment remains on the alternate frequency. However, if the switch 150 is moved to the position for providing the first frequency, relay 210 will be energized to break contacts 211 thereof so that the holding circuit through relay 230 is released and the relay falls out. This will restore the system for operation on the first frequency.

The transmitter 30 may have an antenna relay to selectively connect the antenna to the transmitter when the transmitter is energized and to normally connect the antenna to the receivers. This relay 275 has a movable contact 276 connected to the fixed contact 272 of the relay for transferring the antenna 36 from base station No. 1 to base station No. 2. The movable contact 276 normally engages contact 277 which is connected to the antenna input circuit of the receivers No. 1 and No. 2, and when the relay is energized, movable contact 276 engages contact 278 which is coupled to the radio frequency output of the transmitter.

Figure 5:
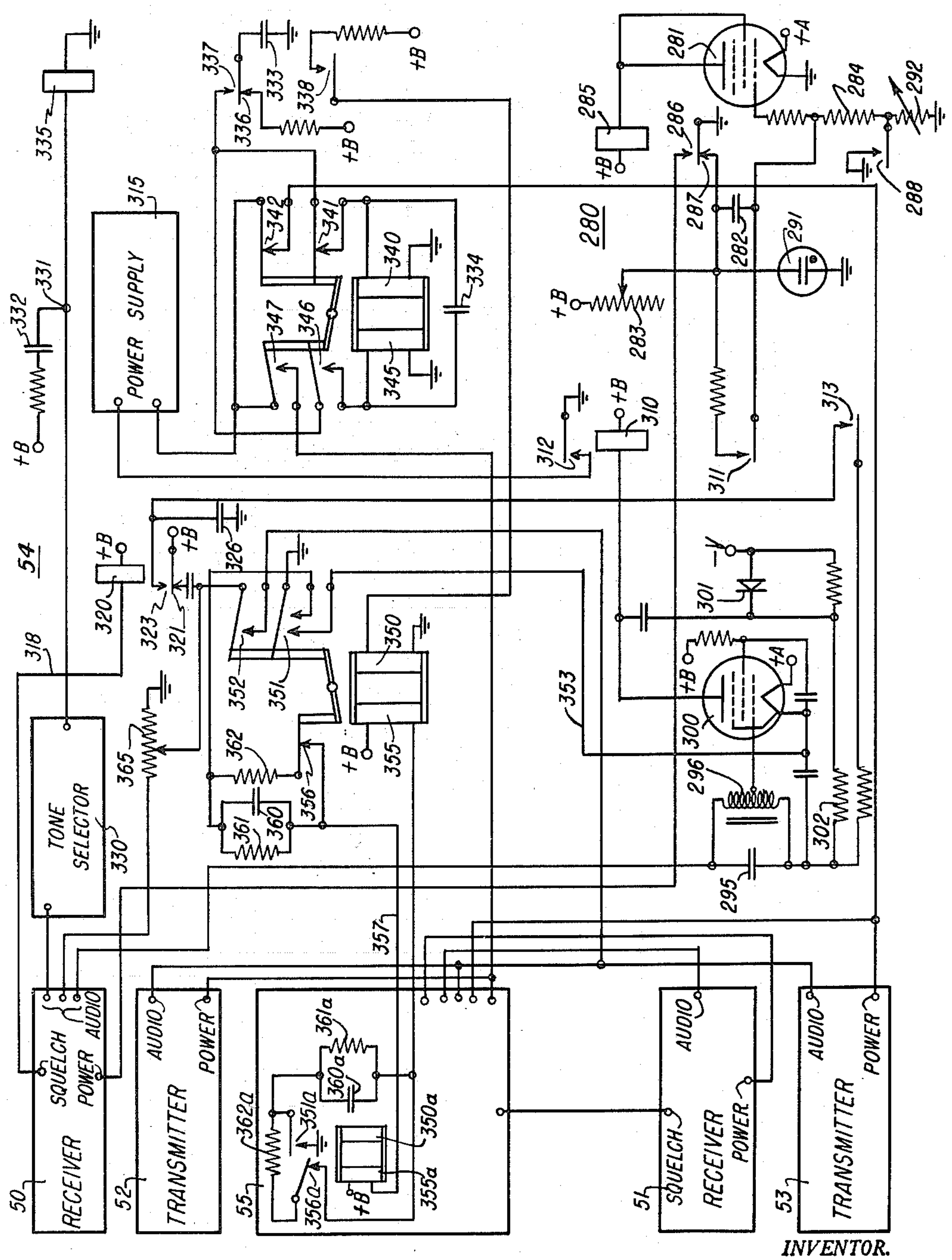
Fig. 5 illustrates the equipment at a relay station.

In Fig. 5 there is shown more in detail the equipment at a relay station. The circuits of the control unit 54 are shown in detail and the connections thereof to the receivers 50 and 51, transmitters 52 and 53, and the second control unit 55. As previously stated, the control unit includes a timer which is designated generally as 280. This includes a tube 281 and a relay 285. The relay 285 includes contacts 286 whch provide a ground for energizing the filaments of the receiver 50. The tube 281 intermittently conducts to operate relay 285 and thereby intermittently energize the receiver.

Considering now the operation of the timer, when the relay 285 operates, and the contacts 287 are open, the condenser 282 will charge through the variable resistor 283 which controls the "on" time of the timer. The charging current of the condenser, flowing through resistor 284, provides a positive potential on the grid of tube 281 so that the tube conducts to hold the relay 285 closed. After condenser 282 charges to a predetermined value, the neon tube 291 conducts to discharge condenser 282 through resistor 284. Resistor 292 is shorted out by relay contacts 288 at this time. This produces a negative voltage on the grid of the tube 281 to block the tube and release the relay. Release of the relay grounds the condenser 282 through contact 287 so that the negative charge of the condenser 282 is applied to the grid of the tube 281. This holds the tube "off" until the capacitor charge is dissipated. Resistor 292 is now operative to control the discharge rate and may be adjusted to set the "off" time of the timer.

To hold the receiver energized when a message is being transmitted, a locking circuit is provided for the timer which is connected to the audio output of the receiver 50. The receiver output is applied to the resonant circuit including condenser 295 and coil 296 which is tuned to the subcarrier frequency such as 6 kilocycles. The selected signal is applied to the grid of tube 300 and is amplified therein. The amplified signal is applied to the rectifier 301 and the resulting direct current potential is applied back to the grid of the tube 300 through resistor 302 and the coil 296. This voltage overcomes the negative bias (−V) normally applied to the grid so that the tube conducts heavily and causes operation of the relay 310 in the plate circuit. Operation of the relay 310 closes contacts 311 which short the condenser 282 so that the tube 281 remains conducting and the relay 285 remains actuated to hold the receiver energized. The relay 310 includes contact 312 which provides a ground for the power supply 315 for energizing the filaments of the transmitters. Relay 310 also includes contacts 313 which make a connection from the carrier hold relay 320 to the grid of the tube 300 to hold this tube highly conducting when the carrier hold relay is energized.

It will be noted that the carrier hold relay 320 is energized by a connection 318 to the squelch circuit of the receiver 50. When the relay 320 is actuated, B plus is applied to the fixed contact 323 which is connected to the contact 313 of relay 310 to hold the tube 300 conducting as previously stated. This B plus connection also provides a voltage for charging condenser 326 which applies a positive potential to the tube 300 to hold it conducting for a period of time after the carrier hold relay 320 releases.

Considering now the circuit for switching from one receiver to the other in response to tones applied to the system, it will be noted that the control unit 54 includes a tone selector 330 connected to the audio output of the receiver 50. When the tone frequency to which selector 330 is responsive is received, the selector intermittently grounds point 331 to discharge condenser 332. After this condenser is discharged, it will be charged again from B plus through relay 335 and the charging current will energize relay 335 to break contacts 336 and close contacts 337 and 338. Contacts 336 normally connect condenser 333 to B plus to charge the same. When the contacts 337 close, the charged condenser 333 is connected through contacts 341 to the coil of relay 340, and through the condenser 334 to the coil of relay 345.

It is to be pointed out that the relays 340 and 345 are interlocked through a magnetic circuit so that when one relay is energized, the other is released and vice versa. The operating coils are magnetically in series so that when a coil is energized in one direction, it adds to the permanent magnet at one relay armature and subtracts at the other. Accordingly, the armature located in the strongest field closes and remains in this position until the field is reversed.

Accordingly, when condenser 333 is connected as shown, it will discharge through the coil 340 with a portion of the discharge current going through condenser 334 and coil 345. This will cause condenser 334 to charge positive on the right side. As coil 340 has greater current than coil 345, the relay will change positions to open contacts 341 and 342 and close contacts 346 and 347. Opening of contacts 341 will remove the condenser from coil 340 and apply it to coil 345. However, condenser 334 will be charged in such direction that the potential from contact 346 through condenser 334 to coil 340 will be greater than the potential applied to coil 345. Accordingly, the relay will not switch again but will remain in the operated position with contacts 341 and 342 open and 346 and 347 closed. On the next operation the charge from condenser 333 will be applied to relay coil 345 to operate this and return the contacts to the position shown in the drawings.

Contacts 342 and 347 selectively connect the transmitter power supply 315 selectively to the transmitters 52 and 53. When the relay is in the position shown, contacts 342 establish the connection to transmitter 53. However, when relay 345 is operated and contact 347 closed, the circuit will be established to the transmitter 52.

Relay 335 also causes operation of the interlocked relays including coils 350 and 355. This relay structure may be identical to the relay structure including coils 340 and 345, with the relay changing positions depending upon the differential current through the two coils. When relay 335 closes contacts 338, B plus potential is applied to the coil 350. This operates the relay to close the contacts 351 and 352. Contacts 351 make two connections, providing ground through conductor 353 to the timer locking circuit to energize the same, and also providing a ground to the parallel circuit including condenser 360 and resistor 361.

Relay 355 is connected in an interlocking circuit with a similar relay 355*a* in the control unit 55. This relay includes contacts 356 which when closed, connect resistor 362 across condenser 360 to short the same. Resistor 362 is of a much smaller value than resistor 361 so that resistor 361 discharges condenser 360 very slowly and resistor 362 will discharge it much more rapidly. Connection from the conductor 357 extending from the contacts 356 goes to the control unit 55 and is connected to the bottom side of the coil therein designated 355*a*. Similarly, the connection 358 from the bottom of the coil 355 extends to the contact 356*a* of control unit 55 which is also connected to condenser 360*a* and resistor 361*a*.

When relay 350 closes, relay 355 will open to break contacts 356. Condenser 360 which is grounded by the closing of contacts 351 will charge through the coil 355*a* of control unit 355 to close the relay 355*a* and open the associated relay 350*a* at the control unit 55. This will close contacts 356*a* to short the condenser 360*a* at the station 55. On the other hand, when relay 350*a* closes at the control unit 55, relay 355*a* will release to open contacts 356*a* so that the condenser 360*a* will charge through coil 355 to energize the same and return the relay on the control unit 54 to the position illustrated in the drawings.

The function of the relay 350, 355 is to selectively connect audio from one of the receivers to the transmitters 52 and 53. This is accomplished through contacts 352. Audio from the receiver 50 is applied through potentiometer 365 to the contact 352 and when this contact is closed, the audio is applied to the two transmitters 52 and 53. Only one of these transmitters will be energized depending upon the operation of the relays 340 and 345 just described. However, when relay 350 is released, and the relay 350*a* in the control unit 55 is energized, audio from the receiver 51 will be applied through the control unit 55 to the two transmitters 52 and 53. One of these transmitters will be energized depending upon the operation of the transmitter control relay in the control unit 55.

Summarizing the operation at a relay station, the two receivers are both intermittently sampling. When a carrier modulated by a 6 kilocycle tone is received at the relay station, the tube 300 in only one of the control units will be rendered conducting to operate its relay 310, since the cathode of only one of these tubes will be grounded through its relay 350. This will depend upon the existing condition of the relays depending upon the last selecting tone received at the relay station. The transmitter power supplies are normally turned off and only the power supply in a selected control unit is energized through the contacts 312 of the carrier relay of this unit. This power supply will be connected either to the transmitter 52 or the transmitter 53 depending upon the condition of the relay 340, 345 of the selected control unit. Accordingly, receiver selection which takes place by a response to the tones transmitted from the base station is the fundamental control. The receivers are interlocked so that only one can be operated at a time. After receiver selection has taken place, transmitter selection is provided from the control unit associated with the selected receiver. Accordingly, very flexible utilization of the equipment is provided.

Figure 6:
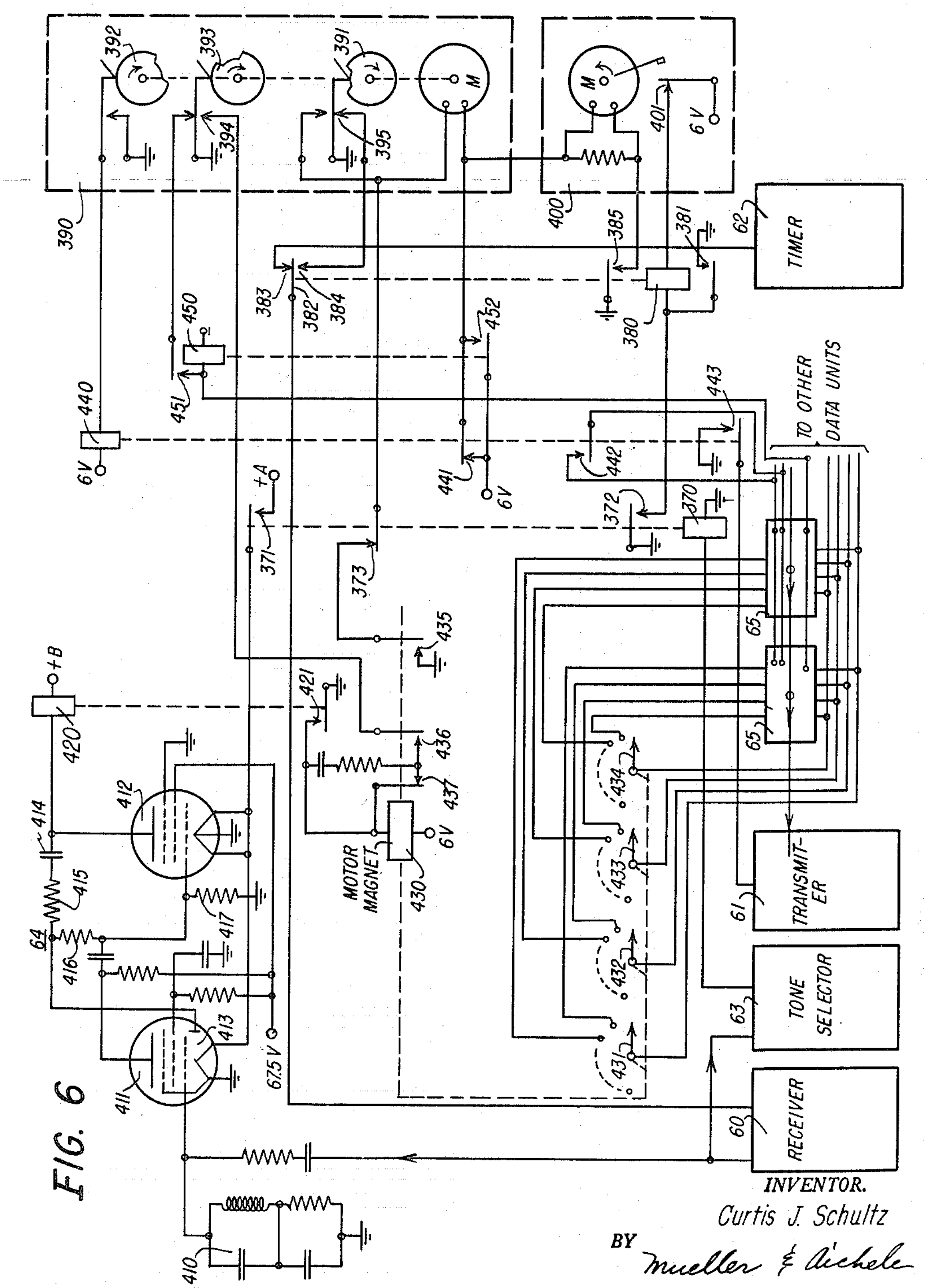
Fig. 6 illustrates the equipment at a data station.

In Fig. 6 there is shown more in detail the equipment at the remote data stations, and particularly the control circuits are illustrated. The output of the receiver 60 is applied to the tone selector 63 and the pulse selector 64. The timer 62 causes the receiver 60 to be intermittently energized. This timer may be a circuit operated by the charging time of a condenser as illustrated in the relay station of Fig. 5.

When the receiver is energized and the tone to which a particular data station responds is received thereby, the tone selector 63 will apply a potential to the relay 370 to energize the same. Contacts 371 of this relay apply filament potential to the pulse selector 64 so that this selector is operative. Contacts 372 apply a ground to relay 380 for actuating the same. Relay 380 includes contacts 381 which establish a holding circuit so that the relay 380 remains energized after the tone is stopped. Relay 370, of course, drops out when the tone ceases.

The relay 380 has a movable contact 382 which is normally connected to contact 383 connected to the timer 62. It is through this connection that the receiver is normally energized as the timer 62 intermittently applies a ground to the lead 383. When the relay 380 is actuated, the contacts 382 thereof engage contacts 384 to apply a ground to this contact through the disc 391 of timer 390. Contacts 385 of the relay 380 close when the relay is actuated to start operation of the timer 400. This is a timer which operates after two minutes to break the contacts 401 to release the relay 380.

When the system has responded to a tone and is in the condition just described, pulsing of the subcarrier signal from the base station causes operation of the pulse selector 64. The audio output from the receiver 60 is applied across a tuned circuit 410 which emphasizes the 6 kilocycle subcarrier. This is amplified in the tube 411 and again in the tube 412. The output of tube 412 is rectified by the diode 413 included in the tube 411. The capacitor 414 is charged during the positive voltage peaks and discharges through the relay 420 and through the circuit including resistors 415, 416 and 417. The voltage across resistor 417 provides a negative bias on tube 412 so that the plate current is reduced to a small value. Accordingly, when the pulses are absent, the biasing action is absent and the relay 420 closes. When the subcarrier reappears, the biasing action is re-established and the relay drops out. The relay does not operate when the circuit is turned on since the tone is present before the pulse selector is turned on.

Closing of the relay 420 closes contacts 421 to establish a ground to the motor winding 430 of a stepping switch. Accordingly as the relay 420 is pulsed by interruptions of the subcarrier wave, the stepping switch 430 operates in a step-by-step manner to cause the wipers 431, 432, and 433 and 434 at the various levels to be moved from one contact to the next. Since the subcarrier is turned off at the base station prior to the turning off of the transmitter, an additional step is not provided as the transmitter is turned off. This is because the relay 370 drops out before the transmitter is turned off, opening contact 371 which removes filament voltage from pulse selector circuit 64 thereby preventing any further stepping of relay 430. As the relay 370 drops out, the contacts 373 thereof close to provide a ground through the now closed off normal contacts 435 of the stepping switch to energize the timer 390.

Operation of the timer causes the disc 391 thereof to open the ground connection to the terminals 384 of relay 380 to thereby deenergize the receiver 60. This ground connection is then established through contact 395 to the motor of the timer 390 to hold the motor energized. Disc 392 of the timer will after an interval provide a ground to the relay 440 which starts the data transmission sequence. The relay 440 breaks contacts 441 thereof to remove the potential source from the timers 390 and 400 so that these timers stop during the data transmission. Relay contacts 442 close a circuit to the data equipments 65 to cause the selected one of these equipments to operate. Contacts 443 provide a ground to the transmitter 61 so that the transmitter is ready to transmit signals from the data equipment.

Information transmitted by the data equipment 65 will depend upon the contact established through the stepping switch levels 431, 432, 433 and 434. That is, depending upon the number of pulses in the movement of the stepping switch, various contacts will be established to the data equipment and this will control the equipment which is connected to the transmitter. At the close of the transmission the selected data equipment 65 will provide a ground to the relay 450. Relay 450 will therefore operate to close contacts 451 to retain the ground through the disc 393 of timer 390. Relay 450 also includes contacts 452 for applying potential to the motors of timers 390 and 400 so that these timers will start operation again. As the timer 390 operates, the disc 392 will move to remove the ground from relay 440 so that this relay drops out. Disc 393 will shortly thereafter remove the ground from relay 450 and provide a ground to contact 394 which extends through the now closed off normal contact 436 to cause the stepping switch 430 to home itself throughout operation of interrupter contacts 437. When the timer 390 continues to its home position, it breaks the holding ground connection established through contact 395 and returns the ground to the receiver filament so that the receivers are again turned on.

The timer 400 was re-set at the beginning of the data transmission period so that this timer will continue to hold the receiver energized for a two-minute period. Accordingly, when the data station calls for a second data program within this period, the operation of the data will be continuous without requiring an additional initiating cycle.

It is to be pointed out that provisions may be made at the data station to provide audio communication over the equipment. Although the data station may be normally unattended, for test or other purposes, an operator at the remote point may desire to communicate over the equipment. Since the receiver is capable of handling audio modulation, it is merely necessary to provide receiving means together with means for holding the receiver energized, and similarly the transmitter may transmit audio back to the base station by provision of means for holding the transmitter energized. To simplify the illustration, such provisions are not illustrated but are within the province of those skilled in the art. In order to initiate operation through a relay station it will be necessary to provide a subcarrier oscillator at the data station as the relay stations are rendered operative only when the subcarrier frequency is applied thereto. A simple six kilocycle oscillator may be provided for this purpose.

It is therefore seen that there is provided a radio communication system for obtaining information from remote points. Operators are not required at the remote stations and relay stations and the equipment thereat is quite simple. The system is entirely under the control of a central operator who may operate controls positioned remote from the base radio station and connected thereto by a single pair wire line.

By energization of the relay and data equipment only intermittently, power is conserved so that small self-contained batteries may provide continued operation over a long period of time. The power requirements are further minimized by the use of relay stations so that relatively long distances may be covered by low power equipment. Of course, when large distances are not involved, the relay stations can be omitted, and it may be desirable in some systems to provide communication with some data stations directly from the base station, and with other data stations through one or more relay stations. By the provision of spare units which may be switched in under control of the operator the loss of service through equipment failure is minimized.

Although one embodiment of the invention has been described which is illustrative thereof, it is obvious that various changes and modifications can be made therein within the intended scope of the invention as defined by the appended claims.

I claim:

1. A system for selectively collecting various items of data from a plurality of remote points including in combination, a central station, a relay station, and a plurality of data stations at said remote points, said central station including radio transmitting means adapted to transmit a carrier wave modulated by a subcarrier wave, means for modulating said subcarrier wave by different tone signals to identify the various data stations, and means for modulating said subcarrier wave by pulses to identify a particular item of data, said relay station including radio receiving and transmitting means adapted to restransmit signals received thereby and a self-contained power source, said radio receiving means at said relay station being normally energized only periodically to conserve said power source and held energized in response to reception of a carrier wave, said data stations each including radio receiving means, radio transmitting means, a self-contained power source, and a plurality of data devices producing signals in accordance with data measured, said radio receiving means at said data stations being normally energized only periodically to conserve said power source thereof and held energized in response to reception of a subcarrier wave modulated by a particular tone signal, and means at said data stations operating when each station is energized and responding to pulse modulation of said subcarrier wave to select a particular data device and applying signals therefrom to said radio transmitting means at said data station, said radio transmitting means at said data station transmitting a carrier wave modulated by signals from said data devices, said relay station receiving carrier waves transmitted by said data stations and transmitting a carrier wave to thereby relay signals from said data stations, and said central station including receiver means for receiving from said relay station carrier waves including signals which originate at said data stations.

2. A system for selectively collecting various items of remote points including in combination, a central station, a relay station, and a plurality of data stations, said central station including radio transmitting means adapted to transmit a carrier wave modulated by a subcarrier wave, means for modulating said subcarrier wave by a tone to identify a desired data station, and means for interrupting said subcarrier wave a predetermined number of times to identify a particular item of data, said relay station including radio receiving and transmitting means and being adapted to relay signals received thereby, said radio receiving means at said relay station being normally energized only periodically, means at said relay station activated in response to reception of said carrier wave modulated by said subcarrier wave to energize said radio receiving means and hold the same energized as long as a carrier wave is received at said relay station, said data stations including radio receiving means and radio transmitting means, said radio receiving means at said data stations being normally energized only periodically and held energized for a predetermined period of time in response to reception of a subcarrier wave modulated by a particular tone, said data station including a plurality of data measuring devices and means responding to the number of interruptions of said subcarrier wave for selecting a particular data measuring device, said transmitting means at said data station transmitting a carrier wave including signals representing the reading of the selected device, said relay station receiving the carrier waves transmitted by said data stations and transmitting a carrier wave for relaying signals from said data stations, and said central station including receiver means for receiving the carrier wave from said relay station including signals which originate at said data stations.

3. A system for selectively collecting various items of data from a plurality of remote points including in combination, a control station, a base station, a relay station, and a plurality of data stations at said remote points, said base station including radio transmitting means adapted to transmit a carrier wave modulated by a subcarrier wave, means for modulating said subcarrier wave by different tone signals to identify the various data stations, and means for modulating said subcarrier wave by pulses to identify a particular item of data, said relay station including radio receiving and transmitting means adapted to relay signals received thereby, said data stations including radio receiving means, radio transmitting means, a plurality of data measuring devices producing signals in accordance with the data measured, first selecting means operating to select the data station in response to reception of a subcarrier wave modulated by a particular tone signal, and second selecting means operating when a station is selected and responding to pulse modulation of said subcarrier wave for selecting a particular data measuring device and applying signals therefrom to said transmitting means at said data station, said relay station relaying signals transmitted by said data stations, said base station including receiver means for receiving from said relay station signals which originate at said data stations, and means interconnecting said control station and said base station for control of said system by said control station and for applying signals from said data stations to said control station.

4. A system for selectively collecting various items of data from a plurality of remote points including in combination, a central station, a relay station, and a plurality of data stations at said remote points, said central station including radio transmitting means adapted to transmit a carrier wave modulated by a subcarrier wave, means for modulating said subcarrier wave by different tone signals to identify the various data stations, and means for further modulating said subcarrier wave to identify a particular item of data, said relay station including first and second radio receiving means and first and second radio transmitting means adapted to relay signals received thereby, selector means at said relay station responsive to tone signals from said central station for selectively energizing said radio receiving means and said radio transmitting means thereat, said data stations including radio receiving means, radio transmitting means, a plurality of data devices producing signals in accordance with data measured, first selecting means operating to select the data station in response to reception of a subcarrier wave modulated by a particular tone signal, and second selecting means operating when a station is selected and responding to further modulation of said subcarrier wave for selecting a particular data device and applying signals therefrom to said transmitting means at said data station, said relay station relaying signals transmitted by said data stations, said central station including receiver means for receiving from said relay station signals which originate at said data stations.

5. A system for selectively collecting various items of data from a plurality of remote points including in combination, a central station, and a plurality of data stations at said remote points, said central station including radio transmitting means adapted to transmit a carrier wave modulated by a subcarrier wave, means for modulating said subcarrier wave by a signal including at least one tone to identify a desired data station, and means for modulating said subcarrier wave by pulses to identify a particular item of data, said data stations including radio receiving means, a self-contained power source, radio transmitting means, a plurality of data measuring devices producing signals in accordance with the data measured, said receiving means being normally intermittently energized for relatively short periods of time to conserve said power source, first selecting means operating to energize the data station for a relatively long period of time in response to reception of a subcarrier wave modulated by a particular tone signal, and second selecting means operating when a station is energized and responding to pulse modulation of said subcarrier wave for selecting a particular data measuring device and applying signals therefrom to said transmitting means at said data station, and said central station including receiver means for receiving signals originating at said data stations.

6. A system for selectively collecting various items of data from a plurality of remote points including in combination, a central station, and a plurality of data stations at said remote points, said central station including radio transmitting means adapted to transmit a carrier wave modulated by a subcarrier wave and receiver means for receiving signals which originate at said data stations, means for modulating said subcarrier wave by a signal including at least one tone to identify a desired data station, said data stations including radio receiving means, radio transmitting means, a plurality of data devices producing signals in accordance with data measured, first selecting means operating to select the data station in response to reception of a subcarrier wave modulated by a particular tone signal, said radio receiving means being intermittently energized for short periods of time and being held energized for a predetermined period in response to selection of a subcarrier wave modulated by a particular tone signal by said first selecting means, said central station including means indicating that the selected data station radio receiving means is held energized and including means for further modulating said subcarrier wave to identify a particular item of data and for transmitting the modulated subcarrier wave to said data station, said data station including second selecting means operating when the station is selected and responding to further modulation of said subcarrier wave for selecting a particular data device and for transmitting signals therefrom from said data station to said central station.

7. A system for selectively collecting various items of data from a plurality of remote points including in combination, a central station, and a plurality of data stations at said remote points, said central station including radio transmitting means adapted to transmit a carrier wave modulated by a subcarrier wave, means for amplitude modulating said subcarrier wave by a signal including at least one tone to identify a desired data station, and means for interrupting said subcarrier wave a number of times to identify a particular item of data, said data stations including radio receiving means, radio transmitting means, a plurality of data measuring devices producing signals in accordance with the data measured, first selecting means responsive to the modulation of said subcarrier wave and operating to select the data station in response to a particular modulating tone signal, and second selecting means operating when a station is selected and responding to interruption of said subcarrier wave for selecting a particular data measuring device in accordance with the number of interruptions of said subcarrier wave, said selected measuring device applying signals to said transmitting means at said data station for transmission thereby, and said central station including receiver means for receiving signals which originate at said data stations.

8. A system for selectively collecting various items of data from a plurality of remote points including in combination, a central station, and a plurality of data stations at said remote points; said central station including means for producing a subcarrier wave and for selectively modulating said subcarrier wave by different tone signals to identify the various data stations, means for further modulating said subcarrier wave to identify a particular item of data, radio transmitting means for transmitting carrier waves of first and second frequencies modulated by said subcarrier wave, first and second receiver means operating at said first and second frequencies respectively for receiving signals originating from said data stations, said data stations being in first and second groups for operation in response to operation of said central stations at said first and second frequencies respectively, each of said data stations including radio receiving means, radio transmitting means, a plurality of data devices producing signals in accordance with data measured, first selecting means operating to select the data station in response to reception of a sub-carrier wave modulated by a particular tone signal, and second selecting means operating when a station is selected and responding to further modulation of said subcarrier wave for selecting a particular data device and applying signals therefrom to said transmitting means at said data station.

9. A system for selectively collecting various items of data from a plurality of remote points including in combination, a control station, a base station, and a plurality of data stations at said remote points; said control station including means for producing a subcarrier wave and for selectively modulating the same by different tone signals to identify the various data stations, and means for further modulating said subcarrier wave to identify a particular item of data; said base station including radio transmitting and receiving means; and means interconnecting said control station and said base station for selectively energizing said transmitting means at said base station, and for applying said modulated subcarrier wave thereto; said data stations including radio receiving means, radio transmitting means, a plurality of data measuring devices producing signals in accordance with the data measured, first selecting means operating to select the data station in response to reception of a subcarrier wave modulated by a particular tone signal, and second selecting means operating when a station is selected and responding to pulse modulation of said subcarrier wave for selecting a particular data measuring device and applying signals therefrom to said transmitting means at said data station for transmission thereby.

10. A system for selectively collecting various items of data from a plurality of remote points including in combination, a control station, a plurality of base stations, a plurality of relay stations, a plurality of data stations at said remote points, each of said base stations including radio transmitting means for transmitting modulated carrier waves of first and second frequencies and first and second receiver means operating at said first and second frequencies, said control station including means for producing a subcarrier wave and for modulating said subcarrier wave by different tone signals to identify the various data stations, and means for modulating said sub-carrier wave by pulses to identify a particular item of data, and means for selectively interconnecting said control station and said base stations for applying signals to a selected base station for energizing the transmitter and selecting the frequency at such base stations, and for applying the modulated subcarrier wave thereto for radio transmission therefrom; said data stations including radio receiving means, radio transmitting means, a plurality of data measuring devices producing signals in accordance with the data measured, first selecting means operating to select the data station in response to reception of a subcarrier wave modulated by a particular tone signal, and second selecting means operating when a station is selected and responding to pulse modulation of said subcarrier wave for selecting a particular data measuring device and applying signals therefrom to said transmitting means at said data station, each of said relay stations including radio receiving and transmitting means adapted to relay signals from said base stations to said data stations and from said data stations to said base stations.

11. A system for selectively collecting various items of data from a plurality of remote points including in combination, a control station, a plurality of base stations, a plurality of relay stations, a plurality of data stations at said remote points; each of said base stations including radio transmitting means for transmitting modulated carrier waves of first and second frequencies modulated by a subcarrier wave, and first and second receiver means operating at said first and second frequencies; said control station including means for producing a subcarrier wave and for modulating said subcarrier wave by different tone signals to identify the various data stations, and means for further modulating said subcarrier wave to identify a particular item of data; and means for selectively interconnecting said control station and said base stations for applying signals to a selected base station for energizing the transmitter and selecting the frequency at such base stations, and for applying the modulated subcarrier wave thereto; said data stations being first and second groups for operation in response to operations of said base stations at said first and second frequencies respectively, each of said data stations including radio receiving means, radio transmitting means, a plurality of data measuring devices producing signals in accordance with the data measured, first selecting means operating to select the data station in response to reception of a subcarrier wave modulated by a particular tone signal, and second selecting means operating when a station is selected and responding to said further modulation of said subcarrier wave for selecting a particular data measuring device and applying signals therefrom to said transmitting means at said data station; said relay stations being in first and second groups for operations with said first and second groups of data stations, each of said relay stations including radio receiving and transmitting means and adapted to relay signals from said base stations to said data stations and from said data stations to said base stations.

12. A system for selectively collecting various items of data from a plurality of remote points including in combination, a control station, a plurality of base stations, a plurality of relay stations, and a plurality of data stations at said remote points; said control station including means for producing a subcarrier wave, means for producing tones of different frequencies, means for selecting a predetermined tone and for modulating said subcarrier wave thereby, means for further modulating said subcarrier wave by pulses; each of said base stations including radio transmitting means adapted to transmit carrier waves of first and second frequencies modulated by said modulated subcarrier wave, and first and second receiver means operating at said first and second frequencies respectively; and means interconnecting said control station and said base stations for selectively connecting one of said base stations, for selecting the frequency of the connected base stations, for selectively energizing the transmitter thereof, and for applying said modulated subcarrier wave thereto; each of said relay stations including first and second radio receiving means and first and second radio transmitting means operating at one of said carrier wave frequencies and adapted to relay signals received thereby, means at said relay station responsive to tone modulation of the received subcarrier wave for selectively energizing one of said receiving means and one of said transmitting means; each of said data stations including radio receiving means, radio transmitting means, a plurality of data measuring devices producing signals in accordance with the data measured, first selecting means operating to select the data station in response to reception of a subcarrier wave modulated by a particular tone, and second selecting means operating when a station is selected and responding to pulse modulation of said subcarrier wave for selecting a particular data measuring device and applying signals therefrom to said transmitting means at said data station; said relay stations relaying signals between said base stations and said data stations.

References Cited in the file of this patent

UNITED STATES PATENTS

| | | |
|---|---|---|
| 2,134,562 | Kimmich | Oct. 25, 1938 |
| 2,250,950 | Goldsmith | July 29, 1941 |
| 2,541,050 | Halstead | Feb. 13, 1951 |
| 2,559,390 | Bladisdell | July 3, 1951 |
| 2,672,598 | Hornfeck et al. | Mar. 16, 1954 |
| 2,699,496 | Magnuski et al. | Jan. 11, 1955 |
| 2,733,296 | Maggio | Jan. 31, 1956 |